US009962675B2

(12) United States Patent
Halford (10) Patent No.: US 9,962,675 B2
(45) Date of Patent: May 8, 2018

(54) TOOL TEMPERATURE CONTROL (75) Inventor: Ben Halford, Rutland (GB)

(73) Assignee: SURFACE GENERATION LIMITED, Rutland (GB)

(*) Notice: Subject to any disclaimer, the term of this patent is extended or adjusted under 35 U.S.C. 154(b) by 714 days.

(21) Appl. No.: 14/342,685

(22) PCT Filed: Aug. 31, 2012

(86) PCT No.: PCT/GB2012/052148
§ 371 (c)(1),
(2), (4) Date: Jul. 23, 2014

(87) PCT Pub. No.: WO2013/034892
PCT Pub. Date: Mar. 14, 2013

(65) Prior Publication Data
US 2015/0048551 A1 Feb. 19, 2015

(30) Foreign Application Priority Data

Sep. 5, 2011 (GB) .................................. 1115291.5

(51) Int. Cl.
B29C 33/04 (2006.01)
B01J 19/00 (2006.01)
B29C 35/02 (2006.01)
B29C 35/04 (2006.01)

(52) U.S. Cl.
CPC ........... B01J 19/0013 (2013.01); B29C 33/04 (2013.01); B29C 33/046 (2013.01); B29C 35/0288 (2013.01); B29C 35/045 (2013.01); B29C 2035/046 (2013.01)

(58) Field of Classification Search
CPC .............. B29C 33/046; B29C 35/0288; B29C 35/0294
See application file for complete search history.

(56) References Cited

U.S. PATENT DOCUMENTS 5,106,285 A * 4/1992 Preston .................. B29C 33/04 425/435
5,830,515 A 11/1998 Pleasant
2005/0035115 A1 2/2005 Anderson

FOREIGN PATENT DOCUMENTS

| DE | 3837999 A1 | 5/1990 |
| EP | 0263798 A1 | 4/1988 |
| FR | 2751573 A | 1/1998 |
| GB | 286024 A | 3/1928 |
| JP | 9308955 A | 12/1997 |
| WO | 2010062234 A1 | 6/2010 |

OTHER PUBLICATIONS

International Search Report dated Mar. 14, 2013 in related PCT application PCT/GB2012/052148.
Search Report under Section 17 dated Jan. 3, 2012 in related application GB1115291.5.

* cited by examiner

Primary Examiner — Alison L Hindenlang
(74) Attorney, Agent, or Firm — Young Law Firm, P.C.

(57) ABSTRACT

A mold tool (10) has a temperature management system having a first fluid based heater (18) heating a first side (12) of the tool, which exhausts to a fluid heater (34) on a second side of the tool (14) and is re-circulated back to the first side (12).

17 Claims, 7 Drawing Sheets

TOOL TEMPERATURE CONTROL

The present invention is concerned with the management of temperature of a mould tool. More specifically the present invention is concerned with management of the temperature of a mould tool which utilises fluid heating and cooling.

Fluid heating of mould tools is known, in particular from the applicant's earlier application published as WO 2011/048365 A1. In this document, fluid-based zone heating of the mould lower face is discussed in order to control the curing properties of the workpiece. When this type of heating is used it is desirable to limit the amount of heat lost to the surrounding environment through the upper mould tool. This is usually achieved by use of an electric heating mat.

Electric heating mats are used to reduce the temperature differential between either the upper mould tool or the upper side of the workpiece (in the case of one-sided tooling) and the environment. As such, less heat is lost from the workpiece or mould tool (heat transfer being generally proportional to the temperature differential). It should be noted that electric heater mats are not provided to directly influence or control the curing process, rather to simply reduce the amount of heat lost from the workpiece or tool.

As such, when the tool is being heated, they aim to reduce the negative temperature differential between the upper tool and the environment (ideally to zero) without providing a positive differential which would heat the tool and influence the curing process. In other words, heating mats are maintained at lower temperature than the fluid heaters used on the underside of the tool.

During cooling, the mats may be deactivated as the temperature of the workpiece drops. That said, electric heater mats may have an insulating effect which is undesirable during the cooling phase.

When the temperature of the workpiece is maintained at a constant level (e.g. held during curing), the mats are generally held at the desired temperature.

A further problem with electric heater mats is that they are expensive to purchase and run. They also require a separate control system to the fluid heater control system.

A general drawback of the system of WO 2011/048365 A1 is that fluid which has been used to heat the tool pin usually retains some residual thermal energy, and its subsequent exhaust to atmosphere is both wasteful and often undesirable in a closed environment such as a factory.

A further drawback of the prior art is that in zone based heating, the zones at the edges of the tool are exposed to ambient, and therefore cannot retain heat as well as the central zones. For example, a 3×3 zone arrangement is divided into nine zones comprising: a central zone, four mid side zones and four corner zones.

Each zone is individually fluid heated. A problem with this approach is that in a 3×3 mould tool such as that shown, the central zone will retain heat more effectively than the mid side zones (because they have one side exposed to ambient), which in turn will retain heat better than the corner zones (which have two sides exposed to ambient).

It is desirable to reduce the thermal losses of the edge zones.

It is an aim of the present invention to overcome or at least mitigate one or more of the above problems.

According to a first aspect of the invention there is provided a mould tool temperature management system comprising:
 a first fluid-based temperature control assembly configured to control the temperature of a first zone of a workpiece, the first fluid-based temperature control assembly having a fluid exhaust,
 a second fluid-based temperature control assembly arranged to control the temperature of a second zone of a workpiece,
 in which the second fluid-based temperature control assembly has an input in fluid communication with the exhaust of the first fluid-based temperature control assembly via a first fluid transfer conduit such that exhaust fluid from the first fluid-based temperature control assembly is reused in the second fluid-based temperature control assembly.

The first zone and the second zone may be on opposing sides of the workpiece. Alternatively the first zone and the second zone may be on the same side of the workpiece.

Preferably the system comprises a plurality of first fluid-based temperature control assemblies exhausting into a common second fluid-based temperature control assembly. Advantageously, if the zones are on different sides of the tool, this provides the beneficial effect of reducing heat loss from the second side of the tool without a complicated ducting system for every zone. As discussed, the function of the second side heating arrangement is only to insulate the second tool to the environment.

Preferably this is achieved using a plenum chamber situated between the exhaust of the first fluid-based temperature control assembly and the inlet of the second fluid-based temperature control assembly, which plenum is arranged to mix the fluid from the plurality of first fluid-based temperature control assemblies. Advantageously this provides a homogenous heat akin to a heating mat.

Preferably there are provided a plurality of first fluid-based temperature control assemblies each exhausting into a respective second fluid-based temperature control assembly. This is particularly beneficial for moulding processes with high temperature variations across the mould tool, and ensures that a mixed fluid in the second assembly from heating any lower temperature zones. Preferably the first and second fluid-based temperature control assemblies are opposite each other to mirror the temperature changes across the workpiece.

Preferably the first fluid-based temperature control assemblies tessellate. This provides a continuous and controllable tool temperature profile.

The first fluid-based temperature control assembly may comprise an in-line air heater.

The first fluid transfer conduit may also comprise an in-line fluid heater, a pump and even a heat sink such as a radiator assembly to bleed excess heat in the cooling cycle.

Preferably the first fluid-based temperature control assembly has an input in fluid communication with an exhaust of the second fluid-based temperature control assembly via a second fluid transfer conduit such that exhaust fluid from the second fluid-based temperature control assembly is reused in the first fluid-based temperature control assembly. The exhaust air (which may still be hot from the second assembly) can therefore be reused without wasting energy.

The second fluid transfer conduit may also comprise an in-line fluid heater, a pump and even a heat sink such as a radiator assembly to bleed excess heat in the cooling cycle.

At least part of the first fluid transfer conduit may be situated within the second fluid transfer conduit. This insulates the hotter first conduit.

According to a second aspect of the invention there is also provided a mould tool comprising a mould tool heat management system according to any preceding claim.

According to a third aspect of the invention there is provided a method of managing the temperature of a mould tool comprising the steps of:

providing a mould tool having a first part defining a workpiece profile, the first part defining a plurality of individually temperature controlled zones of the workpiece, providing a workpiece in contact with the first part of the mould tool, providing a first fluid-based temperature control assembly, controlling the temperature of a first zone of the workpiece with a fluid using the first fluid-based temperature control assembly, providing a second fluid-based temperature control assembly, directing exhaust fluid from the first fluid-based temperature control assembly to the second fluid-based temperature control assembly, controlling the temperature of a second zone of the workpiece with the fluid using the second fluid-based temperature control assembly.

Preferably the method comprises the step of:

providing a second part of the mould tool opposite the first part to define a mould cavity, the second part defining a plurality of individually temperature controlled zones of the workpiece, positioning the workpiece between the first and second parts, in which the second zone is defined on the second part.

Preferably the method comprises the step of directing exhaust fluid from the second fluid-based temperature control assembly back to the first fluid-based temperature control assembly.

Preferably the method comprises the step of:

heating and/or cooling the fluid between the first and second fluid-based temperature control assemblies.

Preferably the method comprises the step of:

pumping the fluid between the first and second fluid-based temperature control assemblies.

According to a fourth aspect of the invention there is provided a method of manufacturing a moulded component comprising the method of the third aspect and the step of using the mould tool to mould a component.

According to a fifth aspect of the present invention there is provided a mould tool comprising:

a first fluid-based temperature control assembly configured to control the temperature of the mould tool, the first fluid-based temperature control assembly having a fluid exhaust; and, a fluid chamber proximate an outer side of the mould tool, in which the fluid exhaust is in fluid communication with the fluid chamber to reduce a temperature difference between the mould tool and the surrounding environment.

Advantageously, the fluid chamber acts to reduce the temperature difference between the mould tool and the surrounding environment, thus reducing the losses during heating.

Preferably the mould tool is divided into a plurality of zones, the plurality comprising a central zone and an edge zone, wherein the first fluid based temperature control assembly is arranged to control the temperature of the central zone, and wherein the fluid chamber is proximate an outer edge of the edge zone. Beneficially, using the hot exhaust from the well insulated central zones boosts the insulating properties of the chamber.

Preferably the tool comprises a mould face, in which an exhaust layer is provided on the opposite side of the tool to the mould face, which exhaust layer is in fluid communication with the fluid chamber. This allows exhaust from central zones to be diverted to the edge zones.

Preferably the tool comprises a flow diverter arranged to influence the exhaust flow to selectively at least partially bypass at least part of the chamber. Preferably the flow diverter is a valve. The valve may be responsive to a flow and/or pressure of the exhaust flow. Preferably the valve is configured to increase bypass flow upon a rise in exhaust flow rate and/or pressure.

Advantageously, this means that during cooling, the exhaust flow (which carried unwanted thermal energy from the mould) will not surround the tool, and a beneficial high difference in temperature between the tool and the surrounding environment will be attained.

An example mould tool heat management system in accordance with the present invention will now be described with reference to the appended drawings in which.

Figure 1:
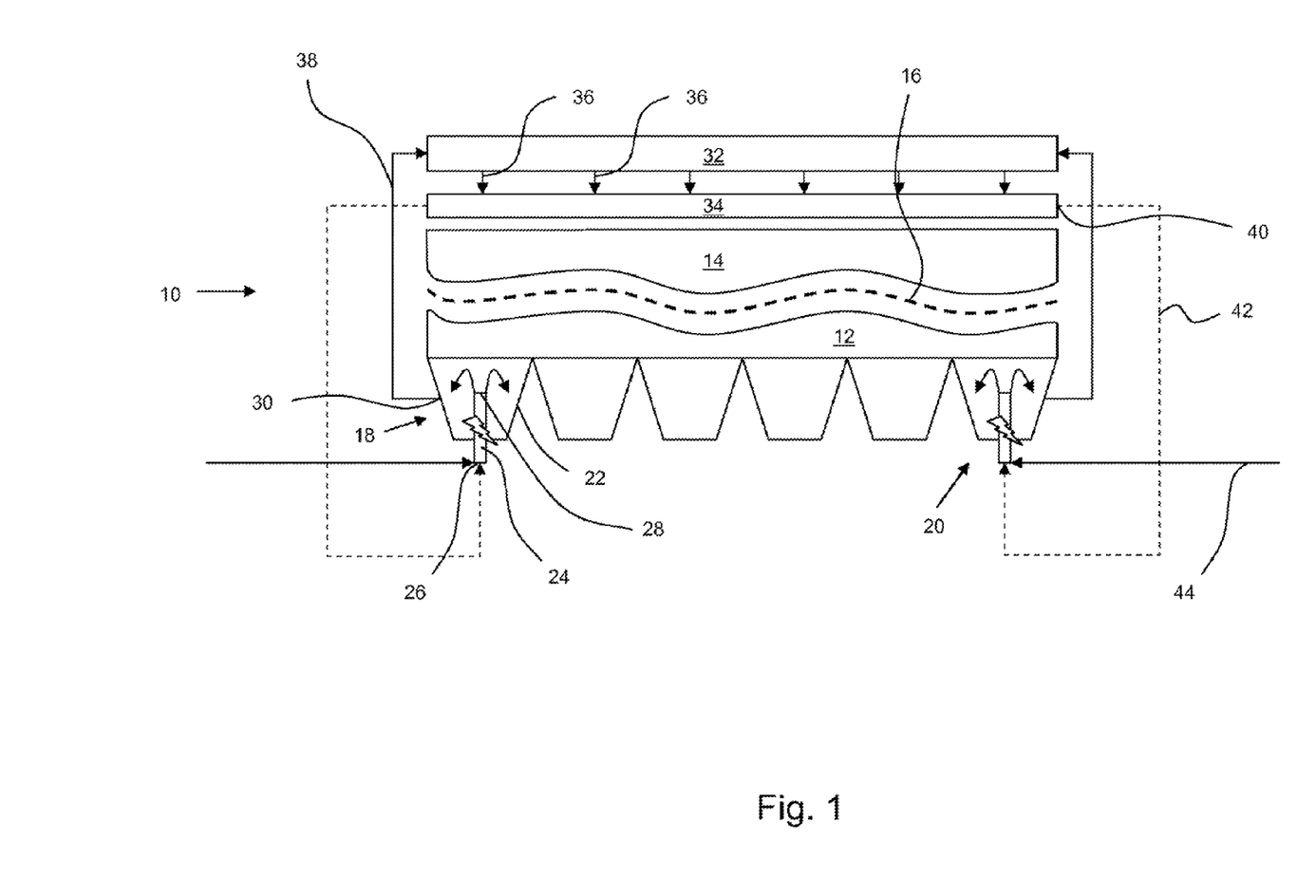
FIG. 1 is a schematic view of as first embodiment of a mould tool heat management system in accordance with the present invention.

FIG. 1 shows a mould tool 10 having a lower mould 12 and an upper mould 14. A workpiece 16 constructed from carbon fibre reinforced plastic (CFRP) is positioned between the moulds 12, 14 for curing as a component.

The lower mould tool is separated into a plurality of zones each heated by a series of adjacent fluid heater assemblies. Only end heater assemblies 18, 20 are shown in detail for clarity. Each heater assembly comprises an inverted divergent fluid chamber 22 and an in-line air heater 24 having an inlet 26 and an outlet 28 directed towards the relevant section of the lower tool 12. Each chamber 22 has an exhaust port 30.

Fluid (in this case air) is pumped into the heater 24 at the inlet 26 where it flows past an electric heating element to exit at the outlet 28 to impinge on a back face of the tool 12. There it heats the tool 12 and flows away to the exhaust 30.

A plenum chamber 32 is provided above the mould tool 10 which is in fluid communication with a single zone in the form of a fluid heater mat 34 via a plurality of equally spaced conduits 36. The heater mat 34 is in conductive contact with the upper tool 14.

Each exhaust port 30 of the chambers 22 is in fluid communication with a first fluid transfer conduit 38, each of which in turn is in fluid communication with the plenum chamber 32. Exhaust air from the chambers 22 is thereby moved into the plenum chamber 32 where it is mixed to a homogenous temperature and pressure and fed to the mat 34 where it is in thermal contact with the upper tool 14. It will be noted that the exhaust air has significant residual thermal energy, and will be at a high temperature compared to the surrounding environment, although lower than the upper tool 14. Therefore the mat 14 will have a similar effect to the aforementioned prior art electric heater mats in insulating the upper tool 14 from heat losses.

The mat 34 defines exhaust ports 40, each of which is connected to a second fluid transfer conduit 42. The second fluid transfer conduit 42 feeds the inlet 26 of each in line air heater 24. As there will still be some residual thermal energy within the air the heating element will require less power to heat the air being passed through the heater 24 to the desired temperature.

An additional ambient air supply 44 is also provided.

Thermocouples are provided at various points in the system, i.e. within the mould tools 12, 14, at the plenum chamber 32 and within the mat 34. Thermocouples may also be positioned in the second fluid transfer conduits 42 proximate the inlets 26 to monitor the feedback temperature.

Figure 2:
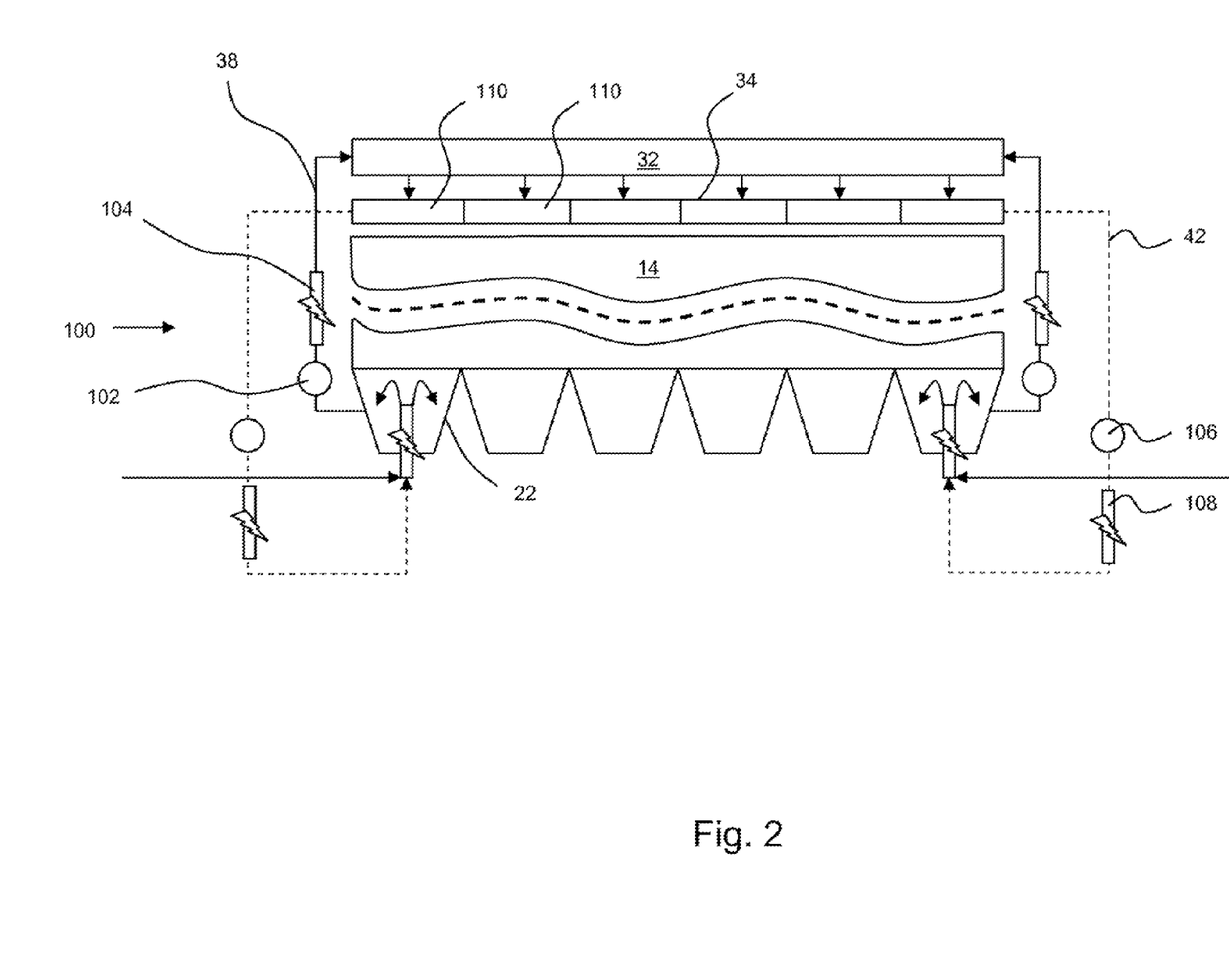
FIG. 2 is a schematic view of a second embodiment of a mould tool heat management system in accordance with the present invention.

Turning to FIG. 2, a similar mould tool 100 to FIG. 1 is shown with like reference numerals designating similar components. The main difference between the tools 10 and 100 is the provision of fluid pump 102 and in-line air heater 104 in the first fluid transfer conduit 38. As such, the temperature and pressure in the plenum 32 can be better controlled and raised if necessary to better insulate the upper mould tool 14.

A further fluid pump 106 and further in-line air heater 108 are provided in the second fluid transfer conduits 42 to increase the temperature and/or pressure of the feed into the chamber 22.

It will also be noted that the mat 34 comprises a plurality of separate cells 110, each of which is matched to a chamber 22. Each cell 110 heats a "zone" of the upper tool.

Figure 3:
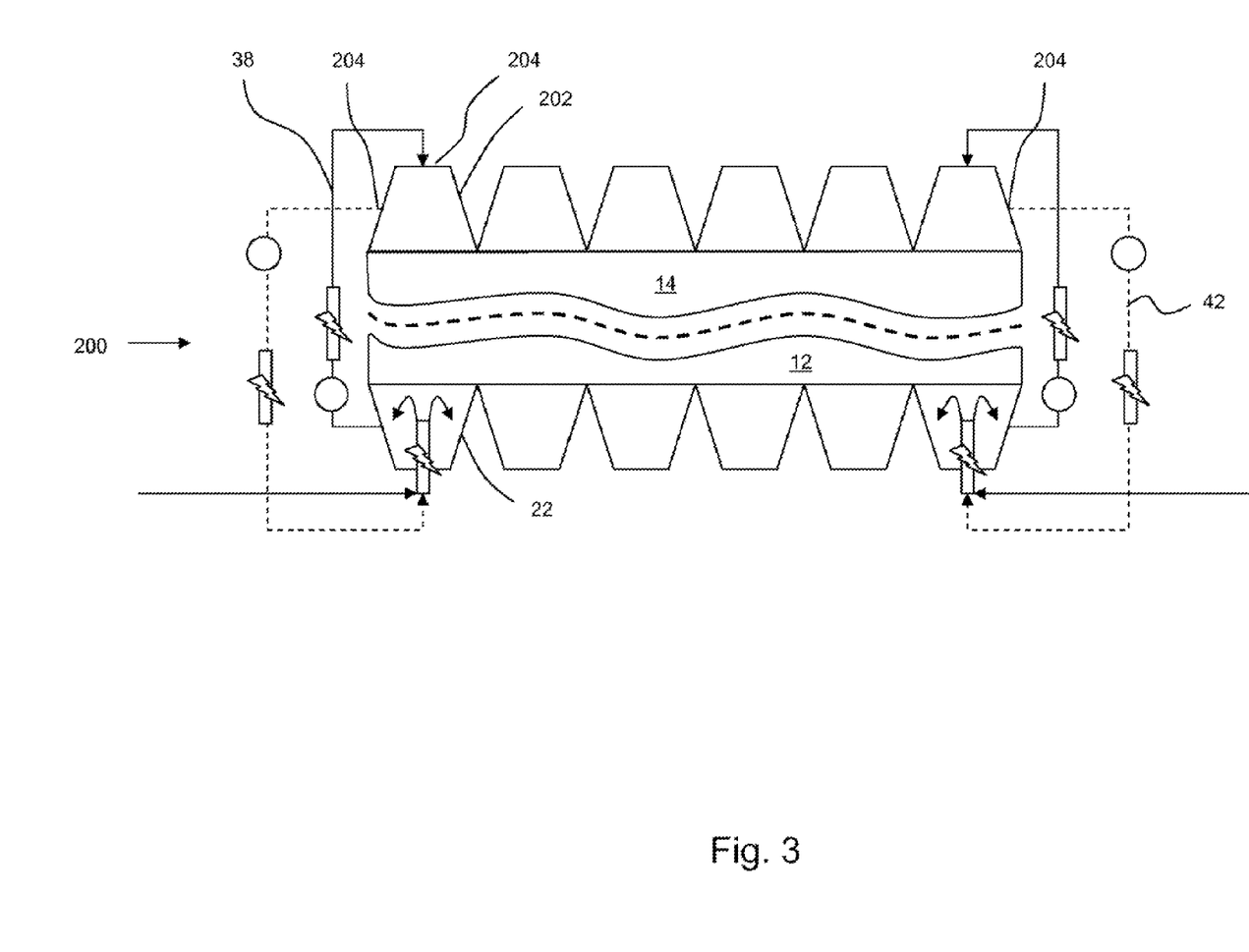
FIG. 3 is a schematic view of a third embodiment of a mould tool heat management system in accordance with the present invention.

Turning to FIG. 3, a third mould tool 200 is shown with like reference numerals with the mould tools 10, 100 designating similar components.

In the case of the mould tool 200, each chamber 22 of a zone of the lower mould tool has a corresponding chamber 202 positioned on the back face of the upper mould tool 14 to heat a corresponding zone. Each first fluid transfer conduit 38 is connected to an input 204 of the chamber 202 where it is directed to impinge on back face of the upper tool 14. An exhaust port 204 is in fluid communication with the second fluid conduit 42.

The advantage of the tool 200 is that it complements zone control of tool heating, and better tailors the temperature of each zone of the upper tool 14 to the lower tool 12 by matching the zones on opposite sides of the mould tool.

Figure 4:
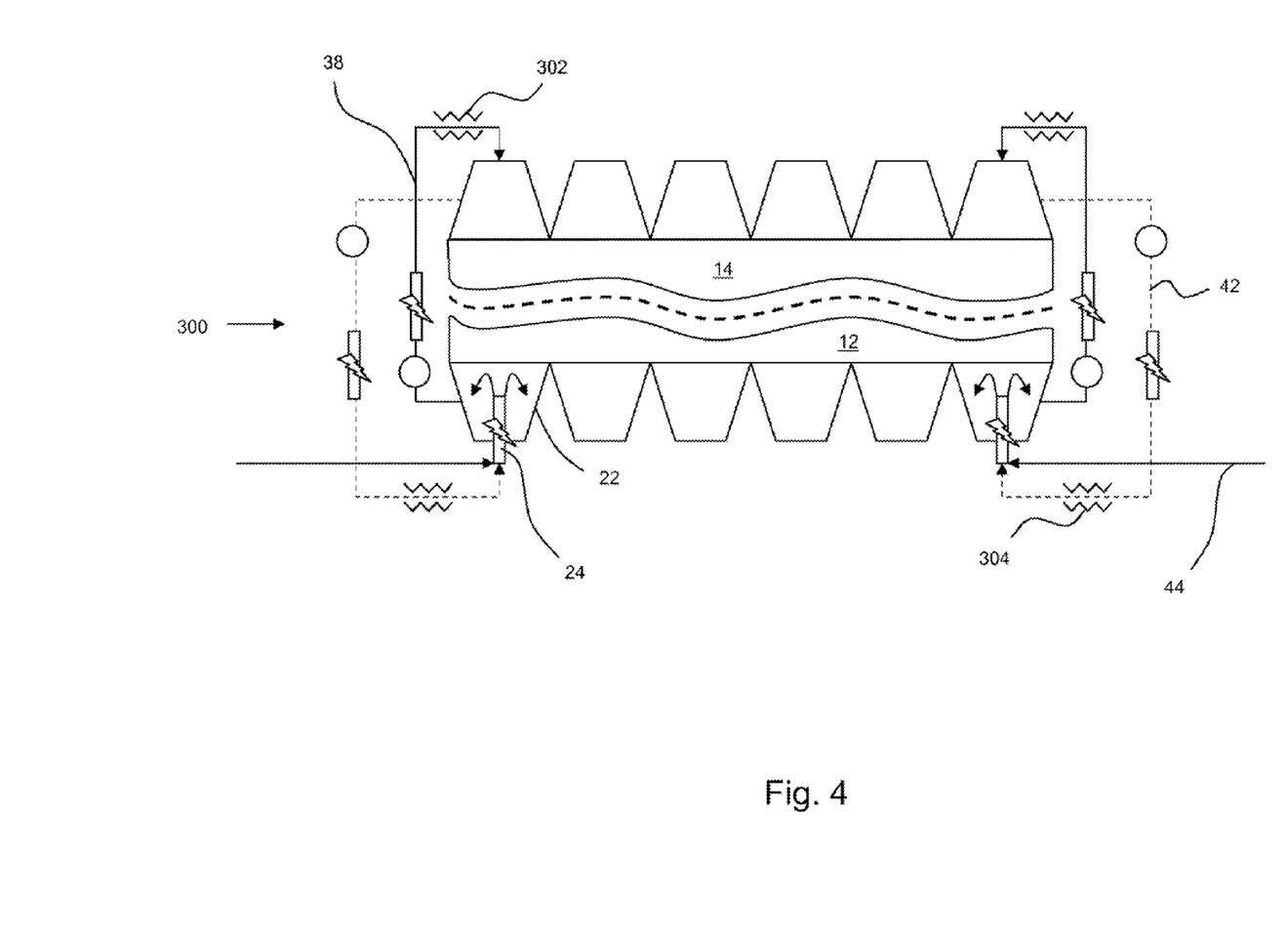
FIG. 4 is a schematic view of a fourth embodiment of a mould tool heat management system in accordance with the present invention.

Turning to FIG. 4, a fourth mould tool 300 is shown with like reference numerals with the mould tools 10, 100, 200 designating similar components.

The main difference between the mould tool 200 and the mould tool 300 is that radiator elements 302, 304 are placed in the first and second fluid transfer conduits 38, 42 respectively. The radiator elements may be selectively active—that is they may define a flow of cooling fluid thereover which can selectively cool the air in the conduits 38, 42. As such, if the mould tool was in a cooling mode, established by deactivation of the heaters 24, the radiator elements would act to remove heat from the system by removing any thermal energy transmitted to the air from the mould tool.

This is advantageous over the known electric heating mats because fluid recirculation can aid the cooling process instead of hampering it (as noted above the electric heating mats can insulate the workpiece when dormant). The radiator elements 302, 304 aid this process by removing heat from the exhausted cooling air before feeding it to the opposite side of the workpiece or tool In this way, the mould tool 300 may have a closed thermal regulation system (with the exception of the addition of energy at the heaters, and removal of energy at the radiator elements). The main benefit is that any thermal energy added to the system is used during the heating cycle without exhausting any hot air to the surroundings. New air may be added (to account for leaks) via the supply 44.

Figure 5:
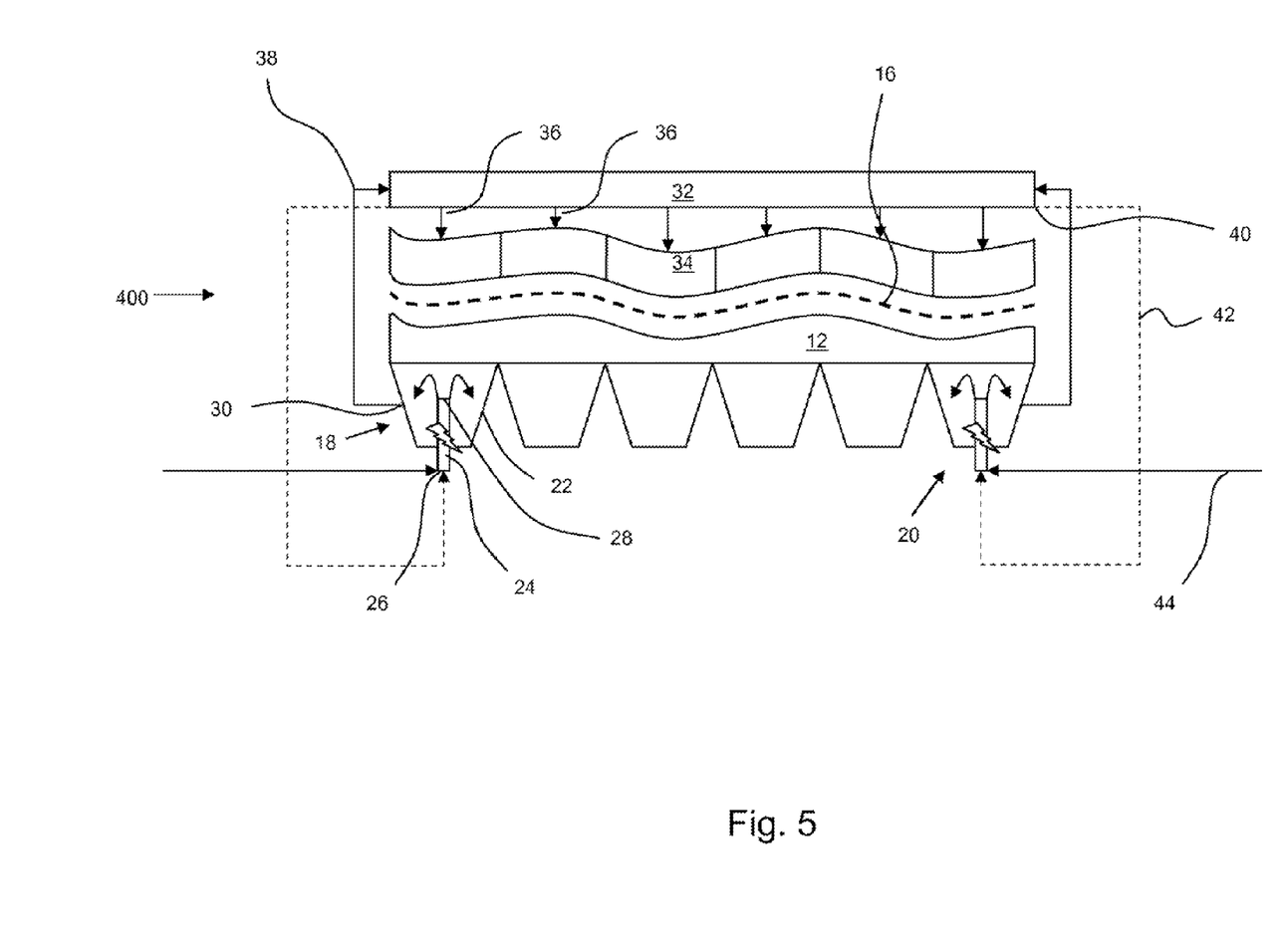
FIG. 5 is a schematic view of a fifth embodiment of a mould tool heat management system in accordance with the present invention.

Turning to FIG. 5, a fifth mould tool 400 is shown, similar to the tool 10, but utilising a single (lower) tool part 12 only (i.e. it is a one-sided tool). A mat 34 is placed directly onto the workpiece 34 to reduce heat loss therefrom (when in the heating phase). The mat 34 is flexible so as to conform to the shape of the draped workpiece 16, and therefore is constructed as a flexible bag like structure with multiple internal cells. Each cell represents a heating zone.

It will be noted that any of the embodiments of FIGS. 1 to 4 are suitable for use with a single sided tool.

Figure 6:
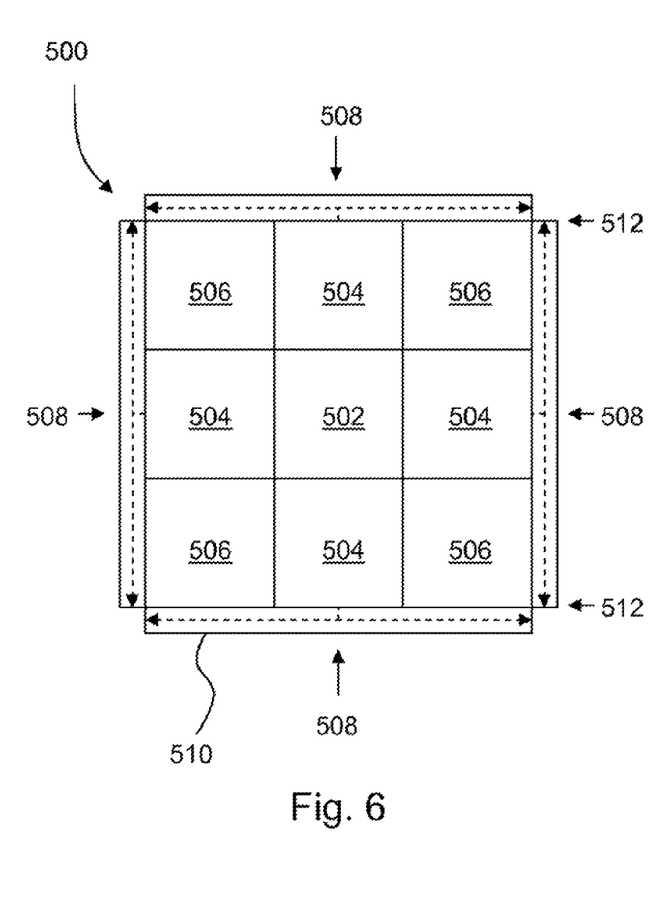
FIG. 6 is a plan view of a sixth embodiment of a mould tool heat management system in accordance with the present invention.

Turning to FIG. 6, a plan view of a mould tool 500 is shown. The mould face side of a mould tool is visible, and is divided into nine zones comprising: a central zone 502, four mid side zones 504 and four corner zones 506.

Each zone is individually fluid heated, as described above. Specifically, each zone has a fluid chamber in contact with a temperature control face of the mould tool, opposite the mould face side. Each zone also has an exhaust, which is in fluid communication with an exhaust layer situated on an opposite side of the fluid chamber to the mould face (i.e. not visible in FIG. 6). The exhaust layer is a large plenum chamber spanning the tool.

The exhaust chamber has four exits 508, each at the midpoint of the tool below the mid side zones. Four fluid chambers in the form of conduits 510 extend around the outer lateral surface of the tool. The conduits 510 are in contact with the edges of the tool (i.e. across the thickness of the tool between the mould face and the temperature control face). The conduits may also be at least partially in contact with the fluid chambers of each zone. Each conduit is in thermal contact with one side of a mid side zone 504, and a side each of two corner zones 506. The conduits exhaust at either end 512 of the corner zones.

Each conduit 510 is in fluid communication with an exit 508 of the exhaust layer, such that exhausted hot fluid is used to increase the temperature at the periphery of the tool zones above ambient. This reduces the difference in temperature between these zones and the surrounding environment, and therefore less heat is lost through convection.

Figure 7:
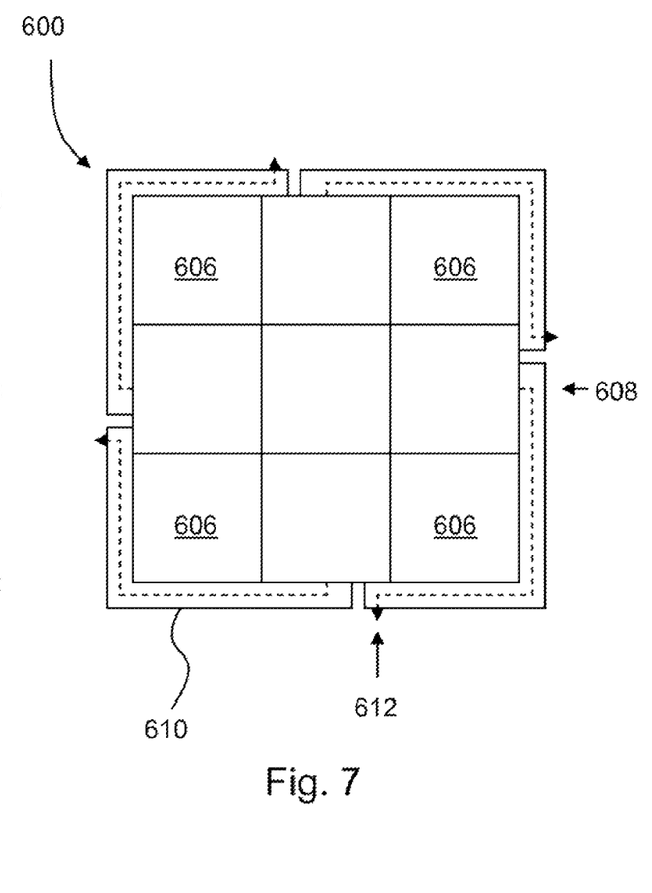
FIG. 7 is a plan view of a seventh embodiment of a mould tool heat management system in accordance with the present invention.

Turning to FIG. 7, a similar tool 600 is shown to the tool 500, but in this case four conduits 610 each surround two sides of a corner zone 606, and exhaust at a point 612 on an adjacent side to an exhaust exit 608.

Figure 8:
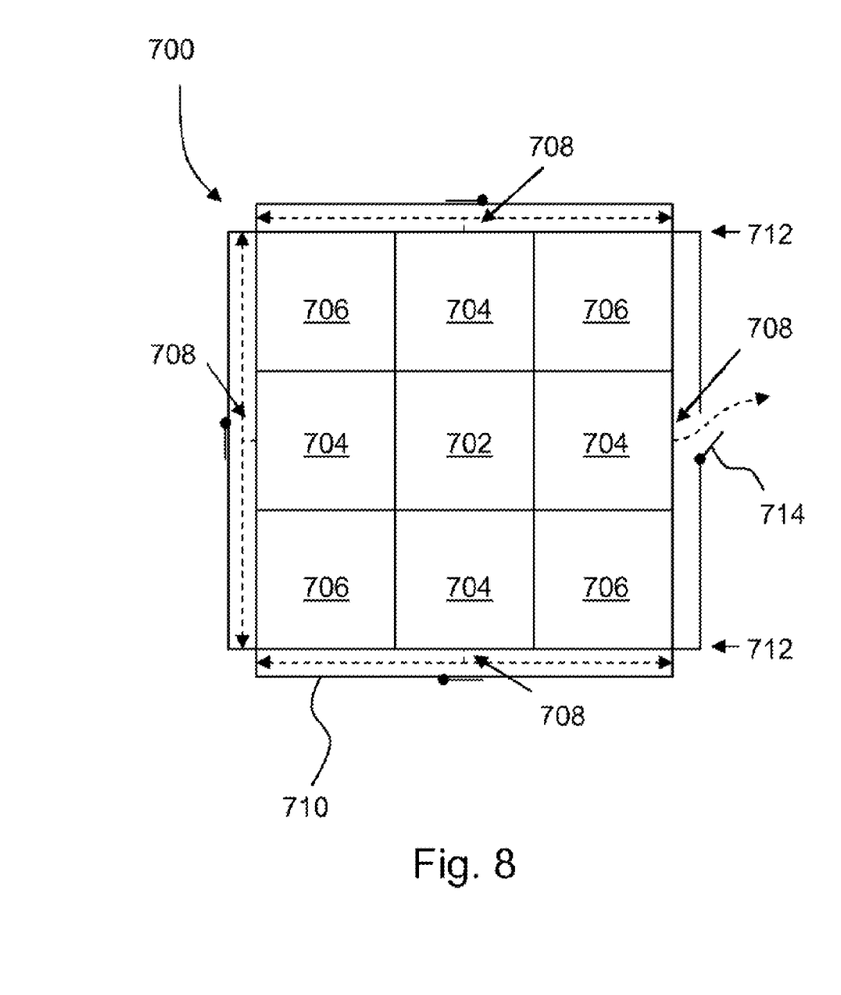
FIG. 8 is a plan view of an eighth embodiment of a mould tool heat management system in accordance with the present invention.

Turning to FIG. 8 a similar tool 700 is shown to the tool 600. The mould face side is divided into nine zones comprising: a central zone 702, four mid side zones 704 and four corner zones 706. The exhaust chamber has four exits 708 into conduits 710. Exits are provided at 712.

The conduits 710 further comprise cooling exhaust valves 714 proximate each exit 708. When the tool 700 is being heated, the valves 714 remain closed (as shown on the left, top and bottom sides of FIG. 8). Therefore the exhaust flow passes over the sides of the zones 704 to the exits 712.

When the tool 700 is being cooled, it is desirable to exhaust as much heat as possible. Therefore it is no longer desirable to insulate the outside of the tool using the conduits 710. As shown on the right hand side of FIG. 8, the exhaust valves 714 open in the cooling mode to exhaust directly without passing the exhaust fluid past the tool.

It is envisaged that the valves 714 operate by remote control from the tool control system (each valve may be operated by a motor). Alternatively, when the tool 700 is being cooled, fluid pressure in the exhaust chamber increases. As such, the valves 714 may be resiliently biased closed, such that they open at a predetermined pressure in the conduits 710. Therefore their action becomes automatic.

This type of exhaust valve could also be applied to the embodiment of FIG. 7.

Variations of the above embodiments fall within the scope of the present invention.

With respect to the embodiments of FIGS. 1 to 5, the first fluid transfer conduit may be contained within an annulus of the second fluid transfer conduit (i.e. a pipe-in-pipe arrangement). This reduces system heat loss to the environment by insulating the first (usually hotter) fluid transfer conduit.

The exhaust valves of the tool 700 may be positioned on the exhaust chamber such that the exhaust fluid does not reach the conduits 710.

The invention claimed is:

1. A mould tool temperature management system comprising:
a first fluid-based temperature control assembly comprising a first in-line fluid heater having a first outlet directing heated fluid into a first fluid chamber to heat a mould tool, and a fluid exhaust from the fluid chamber, the first fluid-based temperature control assembly being configured to control the temperature of a first zone of a workpiece,
a second fluid-based temperature control assembly comprising a second in-line fluid heater having a second outlet directing heated fluid into a second fluid chamber to heat the mould tool, the second fluid-based temperature control assembly configured to control the temperature of a second zone of a workpiece,
wherein the second in-line fluid heater has an input in fluid communication with the exhaust of the first fluid-based temperature control assembly via a first fluid transfer conduit such that exhaust fluid from the first fluid-based temperature control assembly is inputted and reused in the second fluid-based temperature control assembly.

2. A mould tool temperature management system according to claim 1, wherein the first zone and the second zone are on opposing sides of the workpiece.

3. A mould tool temperature management system according to claim 1, wherein the first zone and the second zone are on the same side of the workpiece.

4. A mould tool temperature management system according to claim 2, further comprising a plurality of first fluid-based temperature control assemblies each exhausting into a respective second fluid-based temperature control assembly.

5. A mould tool temperature management system according to claim 4, wherein each of the plurality of first fluid-based temperature control assemblies tessellate.

6. A mould tool temperature management system according to claim 4, wherein each of the plurality of first fluid-based temperature control assemblies comprises an in-line air heater.

7. A mould tool temperature management system according to claim 1, wherein the first fluid transfer conduit comprises an in-line fluid heater.

8. A mould tool temperature management system according to claim 1, wherein the first fluid transfer conduit comprises a pump.

9. A mould tool temperature management system according to claim 1, wherein the first fluid transfer conduit comprises a heat sink.

10. A mould tool temperature management system according to claim 1, wherein the first fluid-based temperature control assembly has an input in fluid communication with an exhaust of the second fluid-based temperature control assembly via a second fluid transfer conduit such that exhaust fluid from the second fluid-based temperature control assembly is reused in the first fluid-based temperature control assembly.

11. A mould tool comprising:
a plurality of first fluid-based temperature control assemblies configured to control the temperature of the mould tool, each of the plurality of first fluid-based temperature control assemblies comprising:
an in-line fluid heater having an outlet;
a temperature control fluid chamber in contact with a surface of the mould tool, the outlet from the in-line fluid heater being directed into the temperature control fluid chamber; and
a fluid exhaust from the temperature control fluid chamber; and
a fluid chamber proximate an outer side of the mould tool, wherein the fluid exhaust is in fluid communication with the fluid chamber to reduce a temperature difference between the mould tool and a surrounding environment.

12. A mould tool according to claim 11, divided into a plurality of zones, the plurality of zones comprising a central zone and an edge zone, wherein the first fluid based temperature control assembly is configured to control the temperature of the central zone, and wherein the fluid chamber is proximate an outer edge of the edge zone.

13. A mould tool according to claim 11, further comprising a mould face, further comprising an exhaust layer on the opposite side of the tool to the mould face, the exhaust layer being in fluid communication with the fluid chamber.

14. A mould tool according to claim 11, further comprising a flow diverter configured to influence the exhaust flow to selectively at least partially bypass at least part of the chamber.

15. A mould tool according to claim 14, wherein the flow diverter comprises a valve.

16. A mould tool temperature management system, comprising:
a plurality of first fluid-based temperature control assemblies, each of the plurality of first fluid-based temperature control assemblies comprising a first in-line fluid heater having a first outlet configured to direct heated fluid into a first fluid chamber to heat a mould tool, and a fluid exhaust from the fluid chamber, each of the first fluid-based temperature control assemblies being configured to control the temperature of a respective first zone of a workpiece;
a second fluid-based temperature control assembly comprising a second in-line fluid heater having a second outlet configured to direct heated fluid into a second fluid chamber to heat the mould tool, the second fluid-based temperature control assembly being configured to control the temperature of a second zone of a workpiece, the second in-line fluid heater having an input in fluid communication with the exhausts of the plurality of first fluid-based temperature control assemblies via a first fluid transfer conduit such that exhaust fluid from the plurality of first fluid-based temperature control assemblies is reused in the second fluid-based temperature control assembly; and a plenum chamber situated between the exhaust of the plurality of first fluid-based temperature control assemblies and the inlet of the second fluid-based temperature control assembly, the plenum chamber being configured to mix the fluid from the plurality of first fluid-based temperature control assemblies.

17. A mould tool temperature management system according to claim 1, wherein the first in-line fluid heater is directed to impinge on a back face of a first mould tool.

* * * * *